J. L. McFARLAND.
CAMERA SHUTTER RELEASER.
APPLICATION FILED MAR. 29, 1918.

1,304,585.

Patented May 27, 1919.

INVENTOR
John L. McFarland

WITNESSES

BY

ATTORNEY

UNITED STATES PATENT OFFICE.

JOHN L. McFARLAND, OF TANGENT, OREGON.

CAMERA-SHUTTER RELEASER.

1,304,585.  Specification of Letters Patent.  Patented May 27, 1919.

Application filed March 29, 1918. Serial No. 225,533.

*To all whom it may concern:*

Be it known that I, JOHN L. MCFARLAND, a citizen of the United States, residing at Tangent, in the county of Linn and State of Oregon, have invented certain new and useful Improvements in Camera-Shutter Releasers, of which the following is a specification.

This invention is a camera shutter releaser and has for its principal object the production of a device which will automatically operate for actuating the cable release of a camera at a predetermined time to enable the operator to place himself in the focus of the camera and be photographed when the camera shutter is acuated by the present invention.

Another object of this invention is the production of a camera shutter releaser wherein simple and efficient means is provided for attaching the housing of the cable release to the plunger of the device, thus causing the stem of the cable release to be shifted by the casing of the present invention at a predetermined time.

Another object of this invention is the production of an operating device for the cable release of a camera, wherein the plunger is reciprocally mounted upon a casing, this plunger being normally urged in the opposite direction to the movement of a casing by an interposed coil spring, the movement of these two elements in opposite direction being regulated by an air cushion within the casing, the air being expelled at a predetermined time to allow the device to actuate the cable release at a predetermined time.

With these and other objects in view, this invention consists of certain novel combinations, constructions, and arrangement of parts as will be hereinafter fully described and claimed.

One practical form of construction and assembly of the present invention will be hereinafter described and is illustrated in the accompanying drawing, in which—

Figure 2:
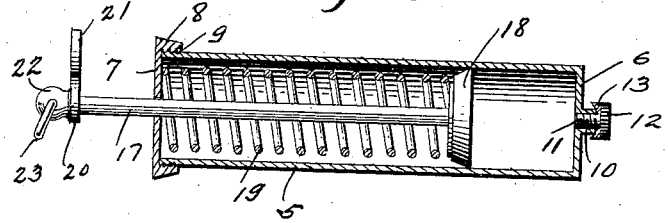
Fig. 2 is a longitudinal section through the device.
Figure 3:
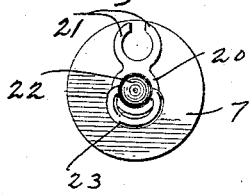
Fig. 3 is an elevation of one end of the device.

In the preferred embodiment of the present invention, about to be described, it will be seen that the elongated cylindrical casing 5 is provided with a solid end 6, while the remaining end of the casing 5 is open as shown in Fig. 2. In order to close this open end, however, there is provided a cap 7 having an annular flange 8, this cap being screwed into engagement with the casing 5 as indicated at 9 to form a closure for the open end of this casing.

Figure 1:
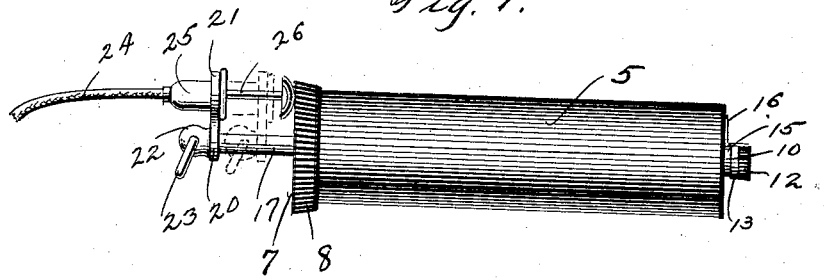
Figure 1 is a side elevation of the camera shutter releaser.
Figure 4:
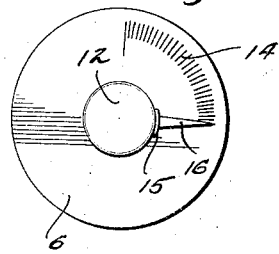
Fig. 4 is an enlarged elevation of the opposite end of the structure.

In order to regulate the passage of air from the casing 5, there is formed a neck 10 upon the closed end 6 of the casing 5 and as this neck is hollow, as shown in Fig. 2, the neck communicates with the interior of the casing 5. The screw body 11 is provided with a head 12, milled upon its periphery as shown in Figs. 1 and 2, thus facilitating the rotation of this screw body. The washer 13 may be positioned upon the screw body to bear against the head 12, thus causing the washer 13 to prevent the escaping of air around through the neck, when the head 12 holds this washer in firm engagement with the outer end of the neck. It is intended to have the screw body 11 of such size as will permit the escape of air from the interior of the casing 5 around through the threads of the screw body at the interior of the neck when the washer 13 is moved far enough from the outer end of the neck to permit the escaping of air at this point. In this connection, attention is invited to Fig. 4, where it will be noted that the closed end 6 of the casing 5 is provided with graduations 14. An indicator body 15 is positioned in any suitable manner upon the head 12 and has a pointer 16 extending at right angles thereto, this pointer being carried so as to be adjacent the closed end 6 of the casing 5. Accordingly, in order to obtain a very accurate adjustment of the device, that is to easily determine the length of time before the device will actuate the cable release of a camera, the head 12 may be turned for moving the screw body and the washer to permit the expelling of air from the interior of the casing as rapidly as desired, in accordance with the movement of the pointer to a desired graduation 14.

The plunger 17 is provided with a flexible piston 18 upon its inner end, whereby when the plunger 17 is withdrawn from the casing 5 to move the piston 18 toward the cap 17 air passes around the periphery of the piston 18 toward the closed end of the casing 5, although the movement of the piston in the opposite direction will cause the piston to expand adjacent its periphery in the usual manner, to prevent the escape of air around the piston and necessitating the escape of air through the valve means hereinbefore described.

The coiled spring 19 is positioned within the casing and has one end bearing upon the cap 7 and the opposite end upon the piston 18. It is therefore obvious that the piston may be pulled toward the cap 7 and under such conditions the coiled spring 19 will be compressed. However, when the plunger 17 is released, the tension of the coil spring will urge the piston into the opposite direction, thus compressing the air within the casing adjacent its closed end and causing the plunger to move inwardly into the casing according to the exhaustion of air from the closed end of the casing 5 by the valve means hereinbefore described.

The gripping claw comprises a body portion 20 carried upon the plunger 17 adjacent the outer end while the fingers 21 extend from the body portion 20 in spaced relation, thus enabling the finger portions to be engaged with the housing of the cable release for holding the plunger in a set position.

The knob 22 is carried upon the outer end of the plunger 17 in any desired manner and has a ring 23 pivotally mounted thereon to facilitate the withdrawing of the plunger from the interior of the casing.

If this is to be used, it is first necessary to focus the camera as desired. The head 12 of the screw body 11 is then screwed down tight onto the end of the neck, to prevent the escape of air at this portion and then the ring 23 may be gripped and pulled to withdraw the plunger from the interior of the casing. As the piston 18 moves toward the cap 7 air will pass around the plunger at the point it passes through the cap 7 and will then pass around the piston 18 toward the closed end 6 of the casing 5. When the spring 19 has been completely compressed and the piston 18 is comparatively near to the cap 7, the plunger is then released and owing to the air carried within the casing, it is obvious the plunger will be held from moving into the casing. At this time however, the operator may turn the head 12 and the screw body 11 for a slight distance and in accordance with the time he desires to have the device operate, this calculation being assisted by the movement of the pointer 16 to a desired graduation 14. As the head 12 of the screw body will be slightly moved outwardly to reduce pressure slightly upon the washer 13, it is obvious air will be gradually expelled from the interior of the casing through the neck 10.

The fingers 21 are then slipped over the protector sleeve 24 of the cable release and then slipped onto the housing 25 of the cable release, as shown in Fig. 1. The gripping claw will then be held against further movement and it is obvious the headed stem 26 will be projecting inwardly toward the cap of the casing 5. The device may then be allowed to hang downwardly, being supported by the cable release and the protector sleeve thereof and at this time the operator may also place himself in the focus of the camera to be photographed when the camera shutter is actuated. At a predetermined time the gradual moving of the casing along the plunger to move the piston 18 toward the closed end 16, by the expelling of air through the valve will cause the headed stem 26 to be engaged with the surface of the cap 7 of the casing 5, as illustrated in full lines in Fig. 1 and the continued movement of the plunger will cause the stem 26 to be forced inwardly into the housing to actuate the cable release for operating the camera shutter to take a picture or a photograph.

At this time the plunger and casing will assume the position indicated in dotted lines in Fig. 1, which dotted lines also illustrate the manner in which the stem 26 will be moved into the housing 25 for actuating the cable release and operating the shutter of the camera.

From the foregoing description, it will be seen that the very simple form of a cable release operating device has been provided which will minimize the cost of production of the invention and will also secure positive operation of the construction. It will also be seen that by pulling the plunger from the casing and then by regulating the air valve, the device may be attached to a cable release of a camera for operating the cable release at a predetermined time thereafter.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

In a device of the class described, the combination of a cylindrical casing having an actuating mechanism and internally threaded neck extending beyond one end of said casing, a screw body carried within said neck, a head formed on the outer end of said screw body a distance from the end of said cylinder, said cylinder having graduations on its end, an indicator body fixed on the periphery of said head and extending in a plane parallel to the longitudinal axis of said screw body, and a pointer formed on the inner end of said indicator body and extending at right angles thereto to rest in a plane parallel to the end of said cylinder, thus causing said screw body to be moved within said neck, at which time said indicator body will shift said pointer, said indicator body also allowing of an easy gripping of said head without interference although the pointer will move over the surface of said cylinder end without danger of being broken or injured when in use.

In testimony whereof I affix my signature in presence of two witnesses.

JOHN L. McFARLAND.

Witnesses:
 EDWARD WASHBURN,
 L. G. LEWELLING.

Copies of this patent may be obtained for five cents each, by addressing the "Commissioner of Patents, Washington, D. C."